United States Patent [19]

Adomeit et al.

[11] 4,408,802
[45] Oct. 11, 1983

[54] ADJUSTABLE VEHICLE SEAT

[75] Inventors: Heinz-Dieter Adomeit, Berlin; Volkmar Schulz, Coburg, both of Fed. Rep. of Germany

[73] Assignees: Heinz-Dieter Adomeit, Berlin; Metallwerk Max Brose GmbH & Co., Coburg, both of Fed. Rep. of Germany

[21] Appl. No.: 247,664

[22] Filed: Mar. 26, 1981

[30] Foreign Application Priority Data

May 9, 1980 [DE] Fed. Rep. of Germany ....... 3018323

[51] Int. Cl.³ .......................... A47C 1/02; A47C 7/02
[52] U.S. Cl. ................................... 297/452; 297/218; 297/219; 297/311; 297/337; 297/353; 297/445; 297/455
[58] Field of Search ............... 297/284, 452, 218, 219, 297/455, 456, 457, 314, 558, 460, 445, 337, 340, 311, 353; 5/446, 447

[56] References Cited

U.S. PATENT DOCUMENTS

| | | | |
|---|---|---|---|
| 2,152,734 | 5/1946 | Ford | 5/446 X |
| 3,273,877 | 9/1966 | Geller | 297/284 |
| 3,462,196 | 8/1969 | Arnold et al. | 297/455 |
| 3,602,548 | 8/1971 | Grams | 297/456 X |
| 3,643,997 | 2/1972 | Gilbert et al. | 297/455 X |
| 3,819,232 | 6/1974 | Wagner | 297/458 |
| 3,877,750 | 4/1975 | Scholpp | 297/284 |
| 4,126,355 | 11/1978 | Rosenheck | 297/284 |
| 4,183,492 | 1/1980 | Meiller | 297/314 X |
| 4,232,899 | 11/1980 | Fister, Jr. | 297/455 X |
| 4,334,709 | 6/1982 | Akiyama et al. | 297/458 X |

FOREIGN PATENT DOCUMENTS

| | | | |
|---|---|---|---|
| 2830783 | 11/1979 | Fed. Rep. of Germany | 297/284 |
| 150117 | 9/1920 | United Kingdom | 297/284 |
| 114795 | 4/1978 | United Kingdom | 297/284 |

Primary Examiner—James T. McCall
Attorney, Agent, or Firm—Allison C. Collard; Thomas M. Galgano

[57] ABSTRACT

An adjustable vehicle seat has an upholstered seat frame and an upholstered back frame. The seat frame is mounted on the vehicle frame independently of the back frame and is adjustable in a heightwise, longitudinally and in an inclined manner with respect to the vehicle frame. The upholstery is displaceable with respect to the seat frame, as well as the back frame.

3 Claims, 7 Drawing Figures

ADJUSTABLE VEHICLE SEAT

The invention relates to an adjustable vehicle seat with an upholstered seat frame and an upholstered back frame.

Known vehicle seat are so arranged that the back frame is pivotably mounted on the lower end of the seat frame. The seat frame itself is displaceable in the longitudinal direction of the vehicle and is mounted on the vehicle floor or floorboard. A heightwise adjustment of the seat frame is carried out by the known embodiment in that the seat frame is mounted on bars running obliquely with respect to the floor of the vehicle, so that in addition to the longitudinal adjustment, the frame is adjustable obliquely to the front and upwardly with respect to the seat face.

This adjustable known vehicle seat has the disadvantage that the seat face can be adjusted in the longitudinal direction of the vehicle, as well as heightwise, with respect to the vehicle floor. In addition to the adjustment of the seat face, the inclination of the back face with respect to the seat face is separately adjustable. However, this adjustability of the seat and back face does not correspond to an optimal degree to the ergonomical requirements for different body heights of the driver. In other words, there is no relative adjustment between the seat face and the back face. This, however, would be required for an optimum adjustment of the support faces and side supports, as well as the height of the seat face relative to the torso curvature, to accommodate the different conditions of the body measurements of the passengers.

It is therefore an object of the invention to improve the aforementioned vehicle seat in such a way that it is adjustable to passengers of different heights without tiring the passengers, and such that it is adjustable relative to the ergonomical requirements of all passengers.

In accordance with the invention, an object of the invention is obtained by the provision of a seat frame which is adjustable, independently of the back frame, in a heightwise and longitudinal direction and at an inclination with respect to the vehicle chassis, and by the employment of upholstery which is displaceable with respect to the seat frame and the back frame.

The invention permits in an advantageous manner, the frames of the seat to be brought into a position which fulfills the requirements for a non-tiring seating position of the person, while simultaneously permitting relatively universal adjustment. The upholstery of the frames is such that it does not hinder the optimum adjustment of the frames themselves. This adjustability is obtained with simple means whereby the upholstery comfort and the core of the upholstery remains unchanged. If, for example, the upholstery of the seat frame and the back frame is unitary, the frames beneath the upholstery may be adjusted into the desired positions, without affecting the relative movements of the person already seated and the upholstery surfaces.

This also enables the adjustment element for the frames to move with a relative low amount of force, because the superimposed position of the upholstery backside and the frame parts may be so constructed that only very low friction forces occur. This enables an adjustment of the frames with respect to the vehicle chassis, by means of small electromotors with hydraulic drives of small dimensions.

A further advantage if that such an adjustability can be obtained with very simple and inexpensive means. Moreover, another advantage is that the the torso midpoint is adjustable with respect to any body height by adjustment of the back frame with respect to the seat frame.

Other objects and features of the present invention will become apparent from the following detailed description when taken in connection with the accompanying drawings which disclose several embodiments of the invention. It is to be understood that the drawings are designed for the purpose of illustration only, and are not intended as a definition of the limits of the invention.

In the drawings, wherein similar reference characters denote similar elements throughout the several views.

Figure 1:
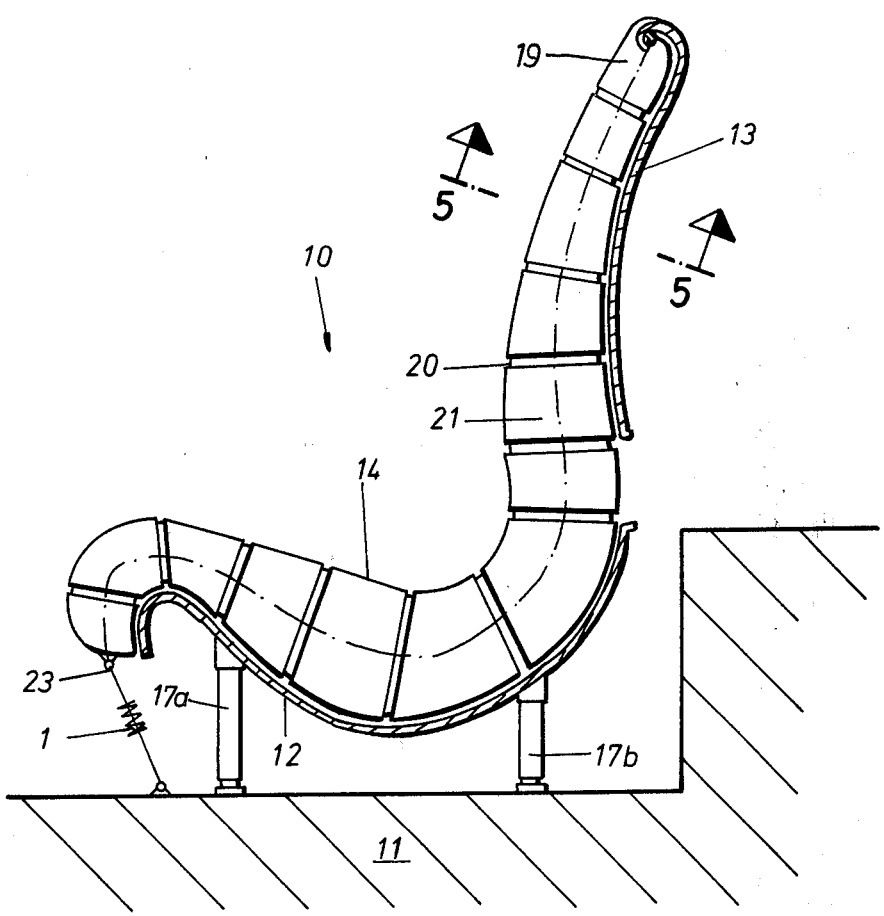
FIG. 1 is a longitudinal sectional view, in part elevation, of a vehicle seat embodying the present invention.
Figure 2:
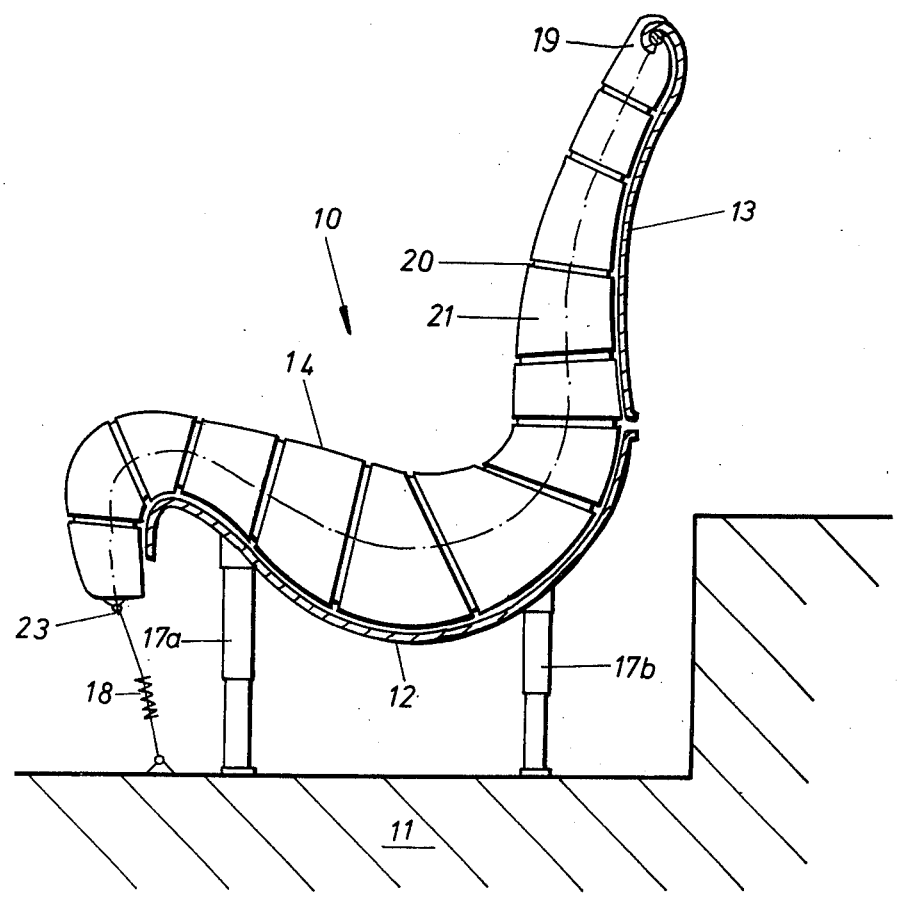
FIG. 2 is a longitudinal sectional view comparable to that of FIG. 1, but with the seat frame raised.

Referring now in detail to the drawings and, in particular FIGS. 1 and 2 thereof, therein illustrated is a vehicle seat 10 which is disposed above a vehicle frame or chassis 11 and which is coupled therewith by means of adjustment devices 17a and 17b. Vehicle seat 10 consists of a seat frame 12 and a separate, independently supported back frame 13 (in the shown embodiment, the connection between back frame 13 and vehicle chassis 11 is not shown). Upholstery 14 extends over and between the two frames 12 and 13. Upholstery 14 is fixedly mounted with its upper end 19 on the upper end of back frame 13. The other end 23 of upholstery 14 is coupled with a pulling or tensioning spring 18. Upholstery 14 is slidably mounted on seat frame 12 and back frame 13.

Back frame 13 may be adjusted by means of simple adjustment devices with respect to its angle of inclination relative to vehicle chassis 11, as well as with respect to its height relative to the vehicle floor. In the shown embodiment, seat frame 12 is connected with chassis 11 by means of adjustment means 17a and 17b consisting of telescopic stroke elements. These adjustment elements 17a, 17b may be adjusted in the longitudinal direction, as a result of which they permit seat frame 12 to be adjusted in a heightwise direction with respect to the chassis floor. They also permit the angle of inclination of seat frame 12 with respect to the vehicle floor to be changed.

For example, front adjustment device 17a may be lengthened by a larger amount than rear adjustment device 17b. In the illustrated embodiment shown in FIG. 1, seat frame 12 is in its lowest position with respect to the vehicle floor. On the other hand, FIG. 2 shows the same seat frame 12 in a raised position with respect to the chassis floor; in this case, both adjustment devices 17a and 17b are extended by the same amount.

In both cases, the angle of inclination and the height of back frame 13 remains unchanged. Naturally, by means of an adjustment means (not shown), back frame 13 may be adjusted into another angle of inclination or into another heightwise position.

Upholstery 14 used in the vehicle seat shown in FIGS. 1 and 2 consist of a number of upholstery elements 21 which are connected into one unit by means of a so-called "upholstery chain." Recesses or notched portions 20 formed, for example, by folded cloth portions extending between respective elements 21, are provided at the adjacent seams of the individual upholstery elements 21. During displacement of upholstery elements 21 in a head-on fashion against each other in the longitudinal direction of upholstery chain 14, recesses 20 may be effectively enlarged or reduced by the folded cloth portions being extended or collapsed in an accordion-like manner. Thereby, it is possible to increase the length of upholstery chain 14 or to reduce the same without impairing the characteristics of the individual upholstery elements 21 and thereby the spring characteristics of the total upholstery chain 14.

When raising seat frame 12 as shown in FIG. 2 with respect to the position shown in FIG. 1, upholstery chain 14 is displaced with respect to seat frame 12 in such a manner that the face of upholstery 14 which is directed toward seat frame 12 is displaced in the direction of the front end of seat frame 12. Tension spring 18 creates a uniform tension in upholstery 14. At the same time, the dimensions in recesses 20 in upholstery 14 in back frame 13 are reduced, so that when lifting the seat frame, the heightwise dimension of upholstery 14 in back frame 13 is reduced. Thereby, the upholstery adjusts to the changed dimension when lifting seat frame 12.

Based on the position of seat frame 12 in the position shown in FIG. 2, back frame 13 may be adjusted independently of seat frame 12 in an upward direction in order to adjust the center of back frame 13 to the back position of the passenger seated after adjusting the seat height. Since the upper end 19 of upholstery 14 is clamped on the upper end of back frame 13, recesses 20 are again enlarged between the individual upholstery elements 21 to accommodate the height adjustment. Also, an adjustment of seat frame 12 in the longitudinal direction of vehicle chassis 11 is made possible by means of adjustment devices (not shown), whereby this adjustment for changing the seat depth occurs independently of the adjustment of back frame 13. In addition, a longitudinal adjustment of the total vehicle seat including back frame 13 is provided, so as to enable the driver to adjust the total seat after adjusting seat frame 12 and back frame 13 to his or her body and to bring the total driver seat into an optimum position which is comfortable with respect to the driving means of the vehicle. It is also recommended to provide an adjustable driver wheel with an adjustable steering shaft, so as to provide an optimum adjustment for the individual driver and his or her body dimensions. Only then is it possible to drive the vehicle for a long period of time without tiring and without the driver losing concentration, due to tiredness.

Figure 5:
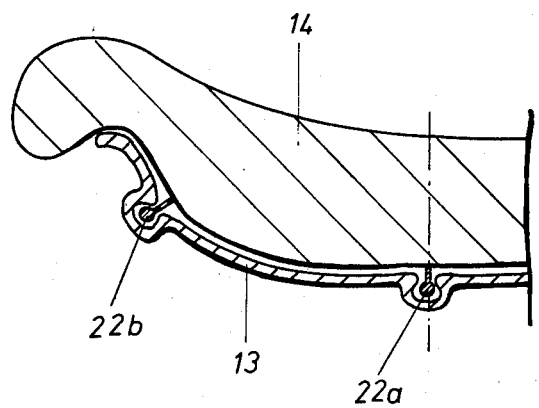
FIG. 5 is a fragmentarily-illustrated sectional view taken along line 5—5 of FIG. 1.
Figure 6:
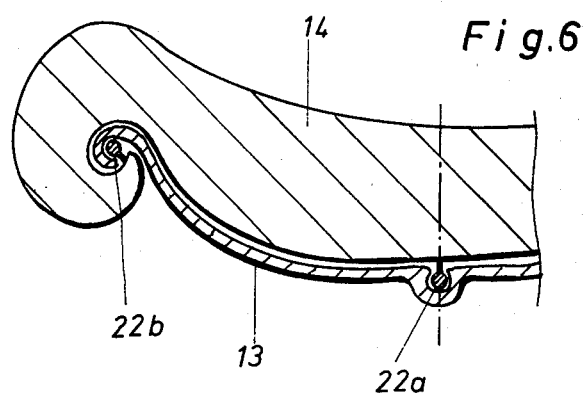
FIG. 6 is a fragmentarily-illustrated sectional view comparable to that of FIG. 5, but showing another embodiment of the upholstery and back frame.
Figure 7:
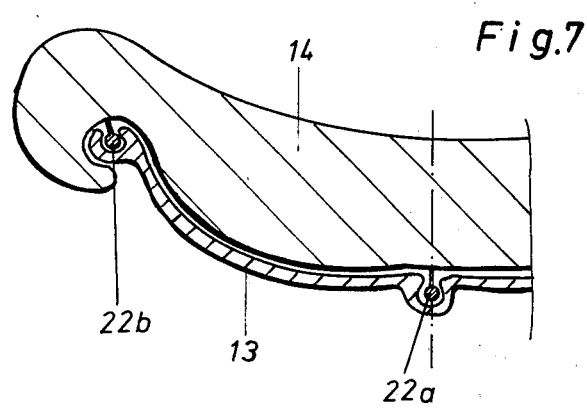
FIG. 7 is a fragmentarily-illustrated sectional view comparable to that of FIGS. 5 and 6, but showing a further embodiment of the upholstery and back frame.

FIGS. 5, 6 and 7 illustrate different embodiments for guiding upholstery chain 14 in back frame 13, wherein only the left half of the back frame is shown with the associted upholstery. As shown in all three embodiments, guides are provided consisting of guide elements 22a, 22b coupled with the inner side of the upholstery and slideably mounted in back frame 13 for movement in a longitudinal direction. In the embodiment shown in FIG. 5, the lateral end of upholstery 14 extends beyond the side edge of back frame 13. The guide of the upholstery is carried out in the center of the frame at 22a and adjacent to the side edge of back frame 13 at 22b. In the embodiment of FIG. 6, guide 22b is mounted on the side edge of frame 13, whereby the upholstery end completely surrounds the side edge of back frame 13. In the embodiment of FIG. 7, the side edge of the upholstery is drawn around the side wall of back frame 13 while guide 22b is disposed on the inside with respect to the upholstery end. The guides shown in FIGS. 5, 6 and 7 for the upholstery in back frame 13 may be provided in the same or a similar fashion in seat frame 12. The important feature is that the total upholstery 14 is easily displaceable in the longitudinal direction with respect to the two frames 12 and 13, so that the faces of the two frames can be changed into the desired height and angles of inclination for supporting the body of the passenger without changing the upholstery characteristics or the upholstery comfort.

Figure 3:
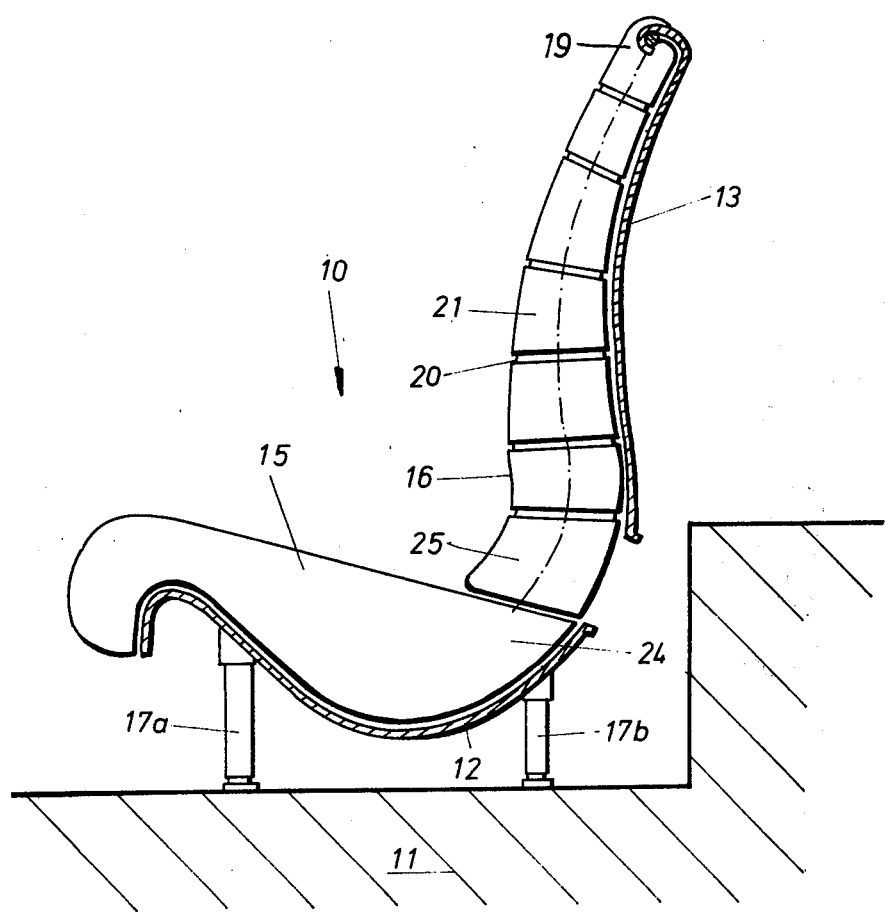
FIG. 3 is a longitudinal sectional view, in part elevation, through a different vehicle seat embodying the present invention.
Figure 4:
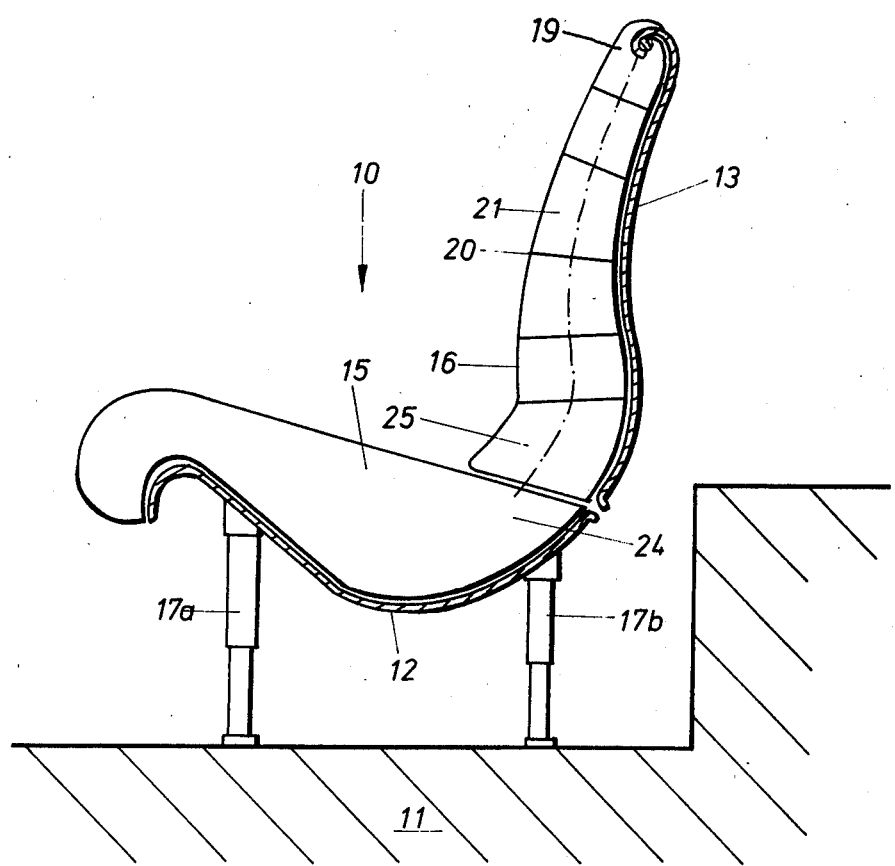
FIG. 4 is a longitudinal sectional view comparable to that of FIG. 3, but with the seat frame raised.

FIGS. 3 and 4 show another embodiment of an adjustable vehicle seat. Vehicle seat 10 is also provided with adjustment devices 17a and 17b and is coupled with vehicle chassis 11. Vehicle seat 10 comprises a seat frame 12 and a back frame 13. The adjustment devices for back frame 13 are not shown as is the case with respect to FIGS. 1 and 2. In this embodiment, back frame 13 is adjustable with respect to the vehicle body independently of seat frame 12 in a heightwise direction, as well as in an inclined direction in the same manner as previously disclosed. In addition, the total vehicle seat 10, i.e., seat frame 12 and back frame 13, may be adjusted in the longitudinal direction of the vehicle chassis, so as to bring seat 10 into position with respect to the driving means, as desired by the driver after adjusting seat frame 12 and back frame 13 to his body dimensions (this known adjustment device for the total vehicle seat 10 is not shown).

In FIG. 3, seat frame 12 is shown in its lowermost position. In contrast thereto, the position of seat frame 12 is shown in an elevated position with respect to the vehicle floor in FIG. 4. This heightwise adjustment of seat frame 12 is carried out by an equal extension of the two adjustment devices 17a and 17b. During this adjustment, the inclined position of the vehicle seat with respect to the vehicle floor, i.e., the inclined position of seat frame 12, remains unchanged. However, this inclined position of seat frame 12 and thereby the inclined position of the vehicle seat can be changed by the two adjustment devices 17a and 17b which can be independently adjusted. It should be emphasized that the adjustment of seat frame 12 is completely independent of the adjustment of back frame 13. Also, seat frame 12 can be adjusted independently of back frame 13 in a longitudinal direction with respect to the vehicle floor, so as to adjust the length of the seat depth.

In this embodiment, a separate seat upholstery 15 is provided. Seat upholstery 15 is separated from the back upholstery 16, i.e., the rear end 24 of seat upholstery 15 has no connection with the lower end 25 of back upholstery 16. Back upholstery 16 consists of a number of upholstery elements 21. These individual upholstery elements 21 are connected with each other, so that an upholstery chain 16 is provided for back frame 13. Recesses 20 are provided on the connecting faces between the individual upholstery elements 21. These recesses 20 may be reduced in the longitudinal direction of upholstery chain 16 when being under stress, so that the total length of upholstery chain 16 is reduced. This is the case when seat frame 12 is lifted with respect to the floor of the vehicle and thereby also with respect to back frame 13 which remains in its position.

During this lifting, rear end 24 of seat upholstery 15 pushes lower end 25 of upholstery chain 16 upwardly. Due to this pressure, the individual recesses 20 are reduced between upholstery elements 21, since upholstery chain 16 is fixedly clamped at the upper end 19 of back frame 13 and cannot escape the longitudinal compressing force. When adjusting back frame 13 in an inclined and in a heightwise direction with respect to the vehicle floor, upholstery 16 can adjust to the different orientations in that recesses 20 between individual upholstery elements 21 are enlarged or reduced even further. Thereby, the upholstery characteristics of upholstery chain 16 remain unchanged during the frame adjustments.

The guides of individual upholstery elements 21 or upholstery chain 16 in back frame 13 in which upholstery chain 16 is mounted in a longitudinally-displaceable direction, may be arranged in the same manner as described in conjunction with FIGS. 5, 6 and 7.

Thus, while only several embodiments of the present invention have been shown and described, it will be obvious that many changes and modifications may be made thereunto, without departing from the spirit and scope of the invention.

What is claimed is:

1. In an adjustable vehicle seat adapted to be installed in a longitudinal vehicle chassis, and including a seat frame, a back frame, and an upholstery disposed on said frames, and wherein said seat frame is adjustable in inclination and along the longitudinal direction independently of said back frame, and said seat frame together with said back frame are adjustable along said longitudinal direction, and are adjustable in height with respect to said vehicle chassis, and said back frame is adjustable in inclination with respect to said seat frame, the improvement comprising said seat frame being adjustable in height independently of said back frame with respect to said vehicle chassis,
said back frame being adjustable independently of said seat frame in the longitudinal direction, and in height with respect to said vehicle chassis and
said upholstery being longitudinally slidably guidable with respect to said frames.

2. The adjustable vehicle seat as claimed in claim 1, wherein said upholstery comprises a plurality of individual elements which are successively coupled at respective coupling portions to form a longitudinal upholstery chain, each coupling portion being formed with a recess of changeable dimensions so as to permit said upholstery chain to be compressed along said longitudinal direction.

3. The adjustable vehicle seat as claimed in claim 2, wherein said frames further comprise guidance means displaceably guiding said upholstery chain along said longitudinal direction, and wherein said upholstery chain is clamped near one end thereof to said frames, and is under tension along its longitudinal direction.

* * * * *